(12) United States Patent
Brown et al.

(10) Patent No.: US 6,879,862 B2
(45) Date of Patent: Apr. 12, 2005

(54) SELECTION AND CONTROL OF MOTION DATA

(75) Inventors: David W. Brown, Bingen, WA (US); Jay S. Clark, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 625 days.

(21) Appl. No.: 09/796,566

(22) Filed: Feb. 28, 2001

(65) Prior Publication Data

US 2001/0034559 A1 Oct. 25, 2001

Related U.S. Application Data

(60) Provisional application No. 60/185,570, filed on Feb. 28, 2000.

(51) Int. Cl.$^7$ .............................................. G05B 11/01
(52) U.S. Cl. ......................... 700/17; 700/83; 700/264; 345/700; 345/764; 345/810
(58) Field of Search ........................... 700/17, 83, 264; 345/700, 764, 810, 704, 771

(56) References Cited

U.S. PATENT DOCUMENTS

| | | | |
|---|---|---|---|
| 4,769,771 A | | 9/1988 | Lippmann et al. |
| 4,800,521 A | | 1/1989 | Carter et al. |
| 4,923,428 A | | 5/1990 | Curran |
| 4,987,537 A | | 1/1991 | Kawata |
| 5,390,304 A | | 2/1995 | Leach et al. |
| 5,392,207 A | * | 2/1995 | Wilson et al. ................. 700/64 |
| 5,625,821 A | | 4/1997 | Record et al. |
| 5,691,897 A | * | 11/1997 | Brown et al. .................. 700/56 |
| 5,724,074 A | * | 3/1998 | Chainani et al. ............. 345/474 |
| 5,746,602 A | * | 5/1998 | Kikinis ........................ 434/169 |
| 5,754,855 A | | 5/1998 | Miller et al. |
| 5,805,785 A | | 9/1998 | Dias et al. |
| 6,012,961 A | | 1/2000 | Sharpe et al. |
| 6,031,973 A | | 2/2000 | Gomi et al. |
| 6,083,104 A | | 7/2000 | Choi |
| 6,288,716 B1 | | 9/2001 | Humpleman |
| 6,290,565 B1 | * | 9/2001 | Galyean III et al. .......... 446/99 |
| 6,295,530 B1 | | 9/2001 | Ritchie et al. |
| 6,301,634 B1 | | 10/2001 | Gomi et al. |
| 6,309,275 B1 | | 10/2001 | Fong et al. |
| 6,400,996 B1 | | 6/2002 | Hoffberg et al. |
| 6,442,451 B1 | | 8/2002 | Lapham |
| 6,497,606 B2 | * | 12/2002 | Fong et al. .................. 446/297 |
| 6,519,594 B1 | | 2/2003 | Li |
| 6,546,436 B1 | * | 4/2003 | Fainmesser et al. ........... 710/5 |
| 6,571,141 B1 | | 5/2003 | Brown |
| 6,652,378 B2 | | 11/2003 | Cannon et al. |
| 6,678,713 B1 | | 1/2004 | Mason et al. |
| 2002/0177453 A1 | | 11/2002 | Chen et al. |
| 2003/0069998 A1 | | 4/2003 | Brown et al. |

* cited by examiner

*Primary Examiner*—Anthony Knight
*Assistant Examiner*—Ronald D Hartman, Jr.
(74) *Attorney, Agent, or Firm*—Michael R. Schacht; Schacht Law Office, Inc.

(57) ABSTRACT

A motion system comprising a processing device, a media source, a motion device, a display, and a software program. The media source, motion device, and display are all in communication with the controller. The software program runs on the processing device and generates an interface comprising a play list and a play button. The play list contains a list of script items, where each script item contains motion data for operating the motion device to perform a desired movement sequence. The play button causes the software program to transfer a selected script item from the play list to the motion device to cause the motion device to perform the desired movement sequence.

22 Claims, 8 Drawing Sheets

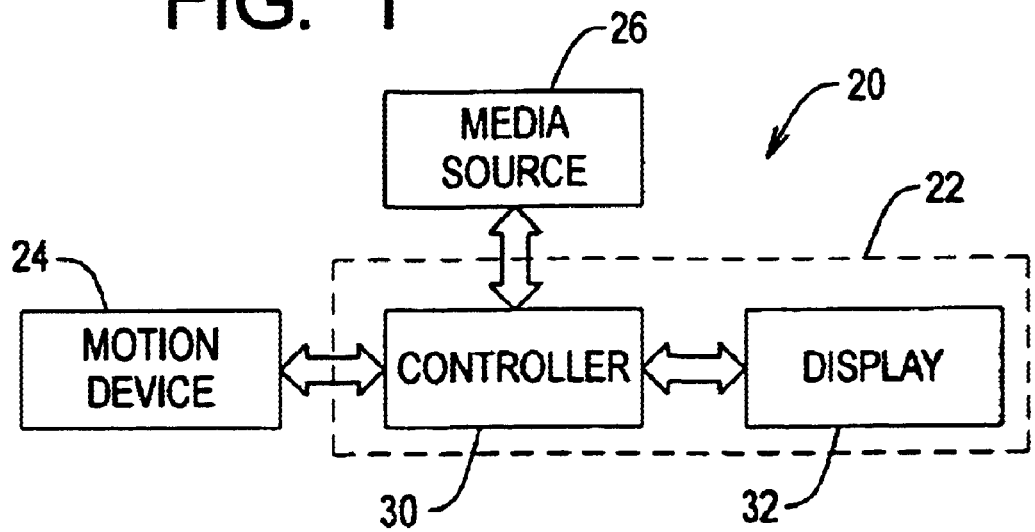
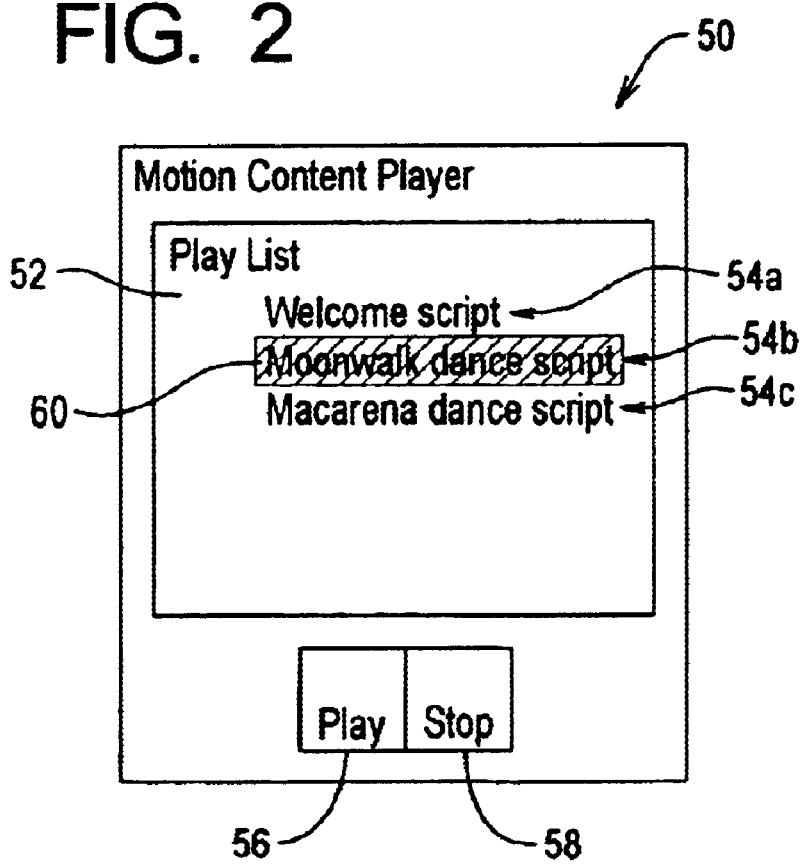

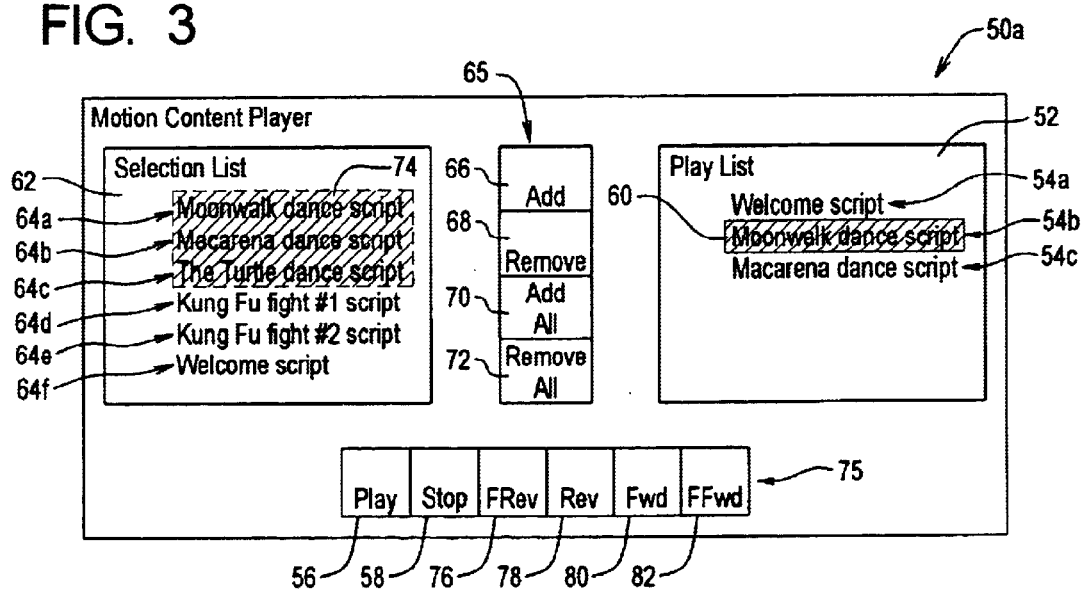
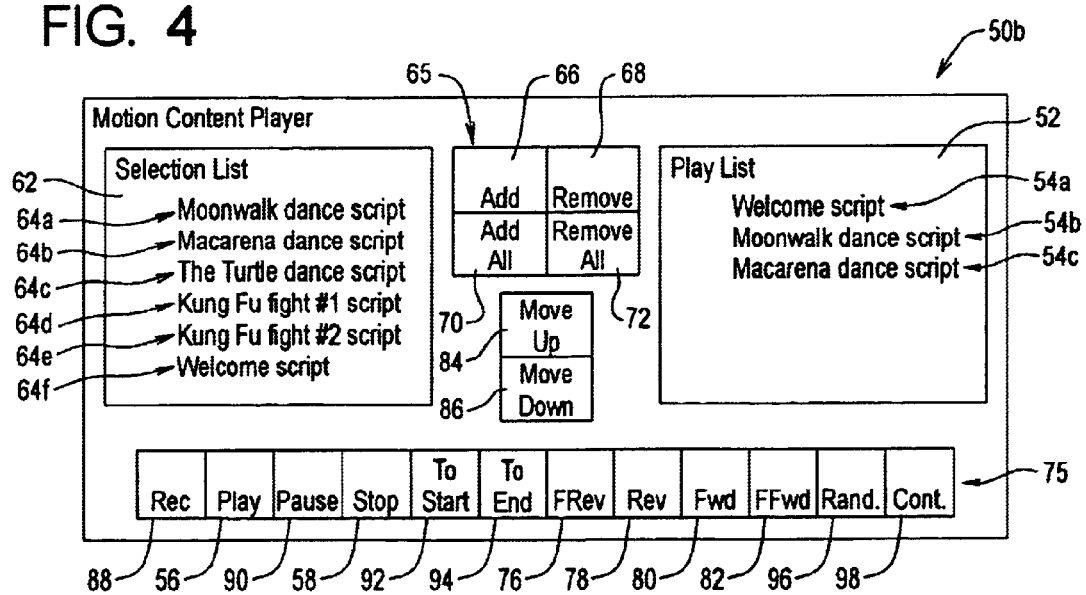

SELECTION AND CONTROL OF MOTION DATA

RELATED APPLICATIONS

This application claims priority of U.S. Provisional Patent Application Ser. No. 60/185,570, which was filed on Feb. 28, 2000.

FIELD OF THE INVENTION

The present invention relates to motion control systems and methods and, more specifically, to systems and methods for selecting and controlling motion data that is then transmitted to a motion control device to cause the motion control device to move in a desired manner.

BACKGROUND OF THE INVENTION

The purpose of a motion control device is to move an object in a desired manner. The basic components of a motion control device are a controller and a mechanical system. The mechanical system translates signals generated by the controller into movement of an object.

While the mechanical system commonly comprises a drive and an electrical motor, a number of other systems, such as hydraulic or vibrational systems, can be used to cause movement of an object based on a control signal. Additionally, it is possible for a motion control device to comprise a plurality of drives and motors to allow multi-axis control of the movement of the object.

The present invention is of particular importance in the context of a mechanical system such as a toy including at least one drive and electrical motor having a rotating shaft that, when rotated, causes movement of the toy, and that application will be described in detail herein. But the principles of the present invention are generally applicable to any mechanical system that generates movement based on a control signal. The scope of the present invention should thus be determined based on the claims appended hereto and not the following detailed description.

In a mechanical system comprising a controller, a drive, and an electrical motor, the motor is physically connected to the object to be moved such that rotation of the motor shaft is translated into movement of the object. The drive is an electronic power amplifier adapted to provide power to a motor to rotate the motor shaft in a controlled manner. Based on control commands, the controller controls the drive in a predictable manner such that the object is moved in the desired manner.

These basic components are normally placed into a larger system to accomplish a specific task. For example, one controller may operate in conjunction with several drives and motors in a multi-axis system for moving a tool along a predetermined path relative to a workpiece. In industry, the basic components described above are often used in conjunction with a host computer or programmable logic controller (PLC). The host computer or PLC allows the use of a high-level programming language to generate control commands that are passed to the controller. Software tools running on the host computer are designed to simplify the task of programming the controller, but the use of such software tools is beyond the ability of average consumers without a background in computer programming.

Another example of a larger system incorporating motion components is a doll having sensors and motors configured to cause the doll to mimic human behaviors such as dancing, blinking, clapping, and the like. Such dolls are pre-programmed at the factory to move in response to stimulus such as sound, internal timers, heat, light, and touch. Programming such dolls requires knowledge of hardware dependent low-level programming languages and is also beyond the abilities of an average consumer.

PRIOR ART

The Applicant is aware of programmable toys such as the Mindstorms® robotics system produced by The LEGO Group. Such systems simplify the process of programming motion systems such that children can design and build simple robots, but provide the user with only rudimentary control over the selection and control of motion data for operating the robot.

SUMMARY OF THE INVENTION

The present invention is a motion system comprising a processing device, a media source, a motion device, a display, and a software program. The media source, motion device, and display are all in communication with the controller. The software program runs on the processing device and generates an interface comprising a play list and a play button. The play list contains a list of script items, where each script item contains motion data for operating the motion device to perform a desired movement sequence. The play button causes the software program to transfer a selected script item from the play list to the motion device to cause the motion device to perform the desired movement sequence.

DESCRIPTION OF THE DRAWING

FIG. 1 is a block diagram of a motion system incorporating a control system constructed in accordance with, and embodying, the principles of the present invention;

FIG. 2 depicts a first embodiment of a user interface that may be used by the control system depicted in FIG. 1;

FIG. 3 depicts a second embodiment of a user interface that may be used by the control system depicted in FIG. 1;

FIG. 4 depicts a third embodiment of a user interface that may be used by the control system depicted in FIG. 1;

DETAILED DESCRIPTION OF THE PREFERRED EMBODIMENTS

Figure 5:
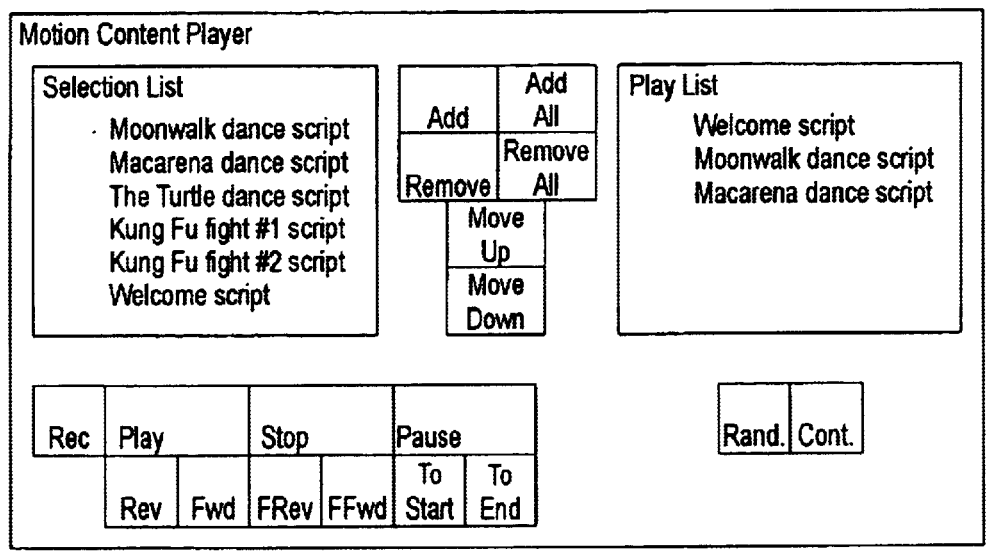
FIG. 5 depicts a fourth embodiment of a user interface that may be used by the control system depicted in FIG. 1.

Referring initially to FIG. 1, depicted therein is a motion system 20 implementing the principles of the present invention. The motion system 20 comprises a control system 22, a motion device 24, and a media source 26 of motion data for operating the motion device 24. The control system 22 comprises a processing device 30 and a display 32.

The processing device 30 receives motion data from the media source 26 and transfers this motion data to the motion device 24. The processing device 30 further generates a user interface on the display 32 for allowing the user to select motion data and control the transfer of motion data to the motion device 24.

The processing device 30 is any general purpose or dedicated processor capable of running a software program that performs the functions recited below. Typically, the processing device 30 will be a general purpose computing platform, hand-held device, cell-phone, or the like separate from the motion device 24 or a microcontroller integrated within the motion device 24.

The display 32 may be housed separately from the processing device 30 or may be integrated with the processing device 30. As such, the display 32 may also be housed within the motion device 24 or separate therefrom.

The processing device 30, motion device 24, and media source 26 are all connected such that motion data can be transmitted therebetween. The connection between these components 30, 24, and 26 can be permanent, such as when these components are all contained within one housing, or these components 30, 24, and 26 can be disconnected in many implementations. The processing device 30 and display 32 can also be disconnected from each other in some implementations, but will often be permanently connected.

One common implementation of the present invention would be to connect the control system 22 to the media source 26 over a network such as the internet. In this case, the processing device 30 will typically run a browser that allows motion data to be downloaded from a motion data server functioning as the media source 26. The processing device 30 will typically be a personal computer or hand-held computing device such as a Game Boy or Palm Pilot that is connected to the motion device 24 using a link cable or the like. The motion device 24 will typically be a toy such as a doll or robot but can be any programmable motion device that operates under control of motion data.

The media source 26 will typically contain a library of scripts that organize the motion data into motion sequences. The scripts are identified by names that uniquely identify the scripts; the names will often be associated with the motion sequence. The operator of the control system 22 selects and downloads a desired motion sequence or number of desired motion sequences by selecting the name or names of these motion sequences. The motion system 20 may incorporate a system for generating and distributing motion commands over a distributed network such as is described in copending U.S. patent application Ser. No. 09/790,401 filed on Feb. 21, 2001, and commonly assigned with the present application; the contents of the application filed on Feb. 21, 2001, are incorporated herein by reference.

The motion data contained in the scripts may comprise one or more control commands that are specific to a given type or brand of motion device. Alternatively, the motion data may be hardware independent instructions that are converted at the processing device 30 into control commands specific the particular motion device or devices to which the processing device 30 is connected. The system 20 may incorporate a control command generating system such as that described in U.S. Pat. No. 5,691,897 owned by the Assignee of the present invention into one or both of the media source 26 and/or processing device 30 to allow the use of hardware independent application programs that define the motion sequences. The contents of the '897 patent are incorporated herein by reference.

At least one motion script is stored locally at the processing device 30, and typically a number of scripts are stored locally at the processing device 30. The characteristics of the particular processing device 30 will determine the number of scripts that may be stored locally.

As generally discussed above, the logic employed by the present invention will typically be embodied as a software program running on the processing device 30. The software program generates a user interface that allows the user to select a script to operate on the motion device 24 and to control how the script runs on the motion device 24.

A number of exemplary user interfaces generated by the processing device 30 will now be discussed with reference to FIGS. 2–6.

A first exemplary user interface depicted at 50 in FIG. 2 comprises a play list 52 listing a plurality of play script items 54a–c from which the user can select. The exemplary interface 50 further comprises a play button 56, a stop button 58, and, optionally, a current play indicator 60. In this first exemplary interface 50, the play list 52 is loaded by opening a file, or downloading the play-list from a network (or Internet) site. Once loaded, selecting the Play button 56 runs all items 54 in the play list 52. Selecting the Stop button 58 causes the play session to stop (thus stopping all motion and/or motion programs from running) and returns the current play position to the beginning of the list 52.

The play list 52 is typically implemented using a software element such as a List box, List view, List control, Tree view, or custom list type. The play list 52 may appear on a main window or in a dialog that is displayed after the user selects a button or menu item. The Play List 52 contains and identifies, in the form of a list of the play script items 54, all motion content that will actually play on the target motion device 54.

The play button 56 is typically implemented using a software element such as a Menu item, button, graphic with hot spot, or other hyper-link type jump. The Play button 56 is selected using voice, touch, keyboard, or other input device. Selecting the Play button 56 causes the processing device 30 to cause the motion device 24 to begin running the script or scripts listed as play script items 54 in the Play List 52. Because the script(s) contains or package motion data or instructions, running the script(s) causes the target motion device 24 to move in the motion sequence associated with the script item(s) 54 in the play list 52. In the exemplary interface 50, the script item 54a at the start of the Play List is first run, after which any other play script items 54 in the play list are run in sequence.

The current play indicator 60 is a visible, audible, tactile, or other indication identifying which of the play script items 54 in the play list 52 is currently running; in the exemplary interface 50, the current play indicator 60 is implemented by highlighting the background of the script item 54 currently being played.

The stop button 58 is also typically implemented using a software element such as a Menu item, button, graphic with hot spot, or other hyper-link type jump and may be selected in the same manner as the play button 56. Selecting the Stop button 58 causes the processing device 30 to stop running the script item 54 currently playing, thereby stopping all motion on the target device 24. The position of the current play indicator 60 position is typically moved to the first script item 44 in the Play List 52 after the stop button 58 is selected.

Referring now to FIG. 3, depicted therein is yet another user interface 50a that may be generated by the software running on the processing device 30. Like the user interface 50 described above, the user interface 50a comprises a play list 52 listing a plurality of play script items 54a–c, a play button 56, a stop button 58, and, optionally, a current play indicator 60. These interface components 52, 54, 56, 58, and 60 were discussed above with reference to the user interface 50 and will be described again below only to the extent necessary for a complete understanding of the interface 50a.

The interface 50a is more full-featured than the interface 50 and uses both the Selection List 62 and the Play List 52. Using the Add, Add All, Remove and Remove All buttons the user can easily move items from the Selection List over to the Play List or remove items from the Play List to create the selections of content items that are to be run. Using the content play controls, the user is able to control how the content is run by the player. Selecting Play causes the content to start playing (i.e. the end device begins moving as specified by the instructions (or data) making up the content. Selecting Stop halts any content that is currently running. And FRev, Rev, Fwd, FFwd are used to change the position where content is played.

The user interface 50a further comprises a selection list 62 that contains a plurality of selection script items 64a–f. The selection script items 64 are a superset of script items from which the play script items 54 may be selected.

Play script items 54 are added to and removed from the play list 52 using one of a plurality of content edit controls 65 comprising an add button 66, a remove button 68, an add all button 70, and/or a remove all button 72. These buttons 66–72 are typically implemented using a software element such as a Menu item, button, graphic with hot spot, or other hyper-link type jump and selected using a voice, touch, keyboard, or other input device.

Selecting the Add button 66 causes a selected selection item 64 in the Selection List 62 to be copied into the Play List 52. The selected item 64 in the selection list 62 may be chosen using voice, touch, keyboard, or other input device and is typically identified by a selection indicator 74 that is or may be similar to the play indicator 60. One or more selection items 64 may be selected and the selection indicator 74 will indicate if a plurality of items 64 have been chosen.

Selecting the Remove button 68 causes the selected item in the Play List 52 to be removed from the Play List 52. Selecting the Add All button 70 causes all items in the Selection List 62 to be copied into the Play List 52. Selecting the Remove All button 72 causes all items in the Play List 52 to be removed.

The interface 50b further comprises a plurality of content play controls 75 comprising a Frev button 76, a Rev button 78, a Fwd button 80, and a FFwd button 82. These buttons 76–82 are also typically implemented using a software element such as a Menu item, button, graphic with hot spot, or other hyper-link type jump and selected using a voice, touch, keyboard, or other input device. The content play controls 75 control the transfer of motion data from the processing device 30 to the target motion device 24 and thus allows the user more complete control of the desired movement of the motion device 24.

Selecting the FRev button 76 moves the current play position in the reverse direction at a fast pace through the content embodied in the play script item 54 identified by the current play indicator 60. When the end of the identified script item 54 is reached, further selection of the FRev 76 button will cause the current play indicator 60 to move to the next script item 54 in the play list 52. Depending upon the capabilities of the motion device 24, the motion device 24 may move at a higher rate of speed when the FRev button 76 is selected or may simply skip or pass over a portion of the motion data contained in the play script item 54 currently being played.

Selecting the Rev button 78 moves the current play position in the reverse direction at a slow pace or in a single step where each instruction (or data element) in the play script item 54 currently being played is stepped in the reverse direction. Selecting the Fwd button 80 moves the current play position in the forward direction at a slow pace or in a single step where each instruction (or data element) in the play script item 54 currently being played is stepped in the reverse direction. Selecting the FFwd button 82 causes an action similar to the selection of the FRev button 76 but in the forward direction.

Referring now to FIG. 4, depicted therein is yet another user interface 50b that may be generated by the software running on the processing device 30. Like the user interfaces 50 and 50a described above, the user interface 50b comprises a play list 52 listing a plurality of play script items 54a–c, a play button 56, a stop button 58, and, optionally, a current play indicator 60. Like the interface 50a described above, the interface 50b comprises content edit controls 65 comprising buttons 66–72 and content play controls 75 comprising buttons 76–82. These interface components 52–82 were discussed above with reference to the user interfaces 50 and 50a and will be described again below only to the extent necessary for a complete understanding of the interface 50b.

Like the interface 50a, the interface 50b uses both the Selection and Play Lists. In addition, the Add, Add All, Remove and Remove All controls are used as well. Two new controls, used for editing the play list, are added to this layout: the Move Up and Move Down controls. The Move Up control moves the currently selected item in the play list to the previous position in the list, whereas the Move Down control moves the currently selected item to the next position in the play list. These controls allow the user to more precisely set-up their play lists before running them on the target device. In addition to the Play, Stop, FRev, Rev, Fwd and FFwd controls used to play the content, six new controls have been added to this layout.

The Rec, Pause, To Start, To End, Rand. and Cont. buttons are new to this layout. Selecting the Rec button causes the player to direct the target to start recording each move and/or other move related data (such as axis position, velocity, acceleration, etc.) Selecting the Pause button causes any currently running content to stop running yet remember the current play position. Selecting Play after selecting Pause causes the player to start playing at the play position where it was last stopped. To Start and To End move the current play position to either the start or end of all items in the content list respectively. Selecting Rand directs the player to randomly select items from the Play List to run on the target device. Selecting Cont causes the player to continuously run through the Play List. Once the last item in the list completes, the first item starts running and this process repeats until continuous mode is turned off. If both Cont and Rand are selected the player continuously selects at random each item from the play lists and plays each. When running with Rand selected and Cont not selected, each item is randomly selected from the Play List and played until all items in the list have played.

The content edit controls 65 of the exemplary interface 50b further comprise a Move Up button 84 and a Move Down button 86 that may be implemented and selected in a manner similar to any of the other buttons comprising the interface 50b. Selecting the Move Up button 84 causes the current item 54 selected in the Play List 52 to move up one position in the list 52. Selecting the Move Down button 86 causes the current item 54 selected in the Play List 52 to move down one position in the list 52.

The content play controls 75 of the exemplary interface 50b further comprise a Rec button 88, a Pause button 90, a To Start button 92, a To End button 94, a Rand. button 96, and a Cont. button 98. Selecting the Rec button 88 causes the processing device 30 to begin recording content from the target device 24 by recording motion instructions and/or data into a script that can then be replayed at a later time.

Selecting the Pause button causes the processing device 30 to stop running content and store the current position in the script (or stream). Subsequent selection of the Play button 56 will continue running the content at the stored position in the script.

Selecting the To Start button 92 moves the current play position to the start of the first item 54 in the Play List 52. Selecting the To End button 94 moves the current play position to the end of the last item 54 in the Play List 52.

Selecting the Rand. button 96 causes the processing device 30 to enter a random selection mode. When running in the random selection mode, play script items 54 are selected at random from the Play List 52 and played until all of the items 54 have been played.

Selecting the Cont. button 98 causes the processing device 30 to enter a continuous run mode. When running in continuous run mode and the last item 54 in the Play List 52 is played, the current play position is reset to the beginning of the Play List 52 and all content in the list 52 is run again. This process repeats until continuous mode is turned off. If random mode is enabled when the Cont. button 98 is selected, play script items 54 are continuously selected at random and run until continuous mode is turned off.

Referring now to FIG. 5, depicted therein is yet another exemplary interface 50c that is similar to the interface 50b described above but the control buttons have been rearranged in a different configuration that may be preferable under some circumstances.

Figure 6:
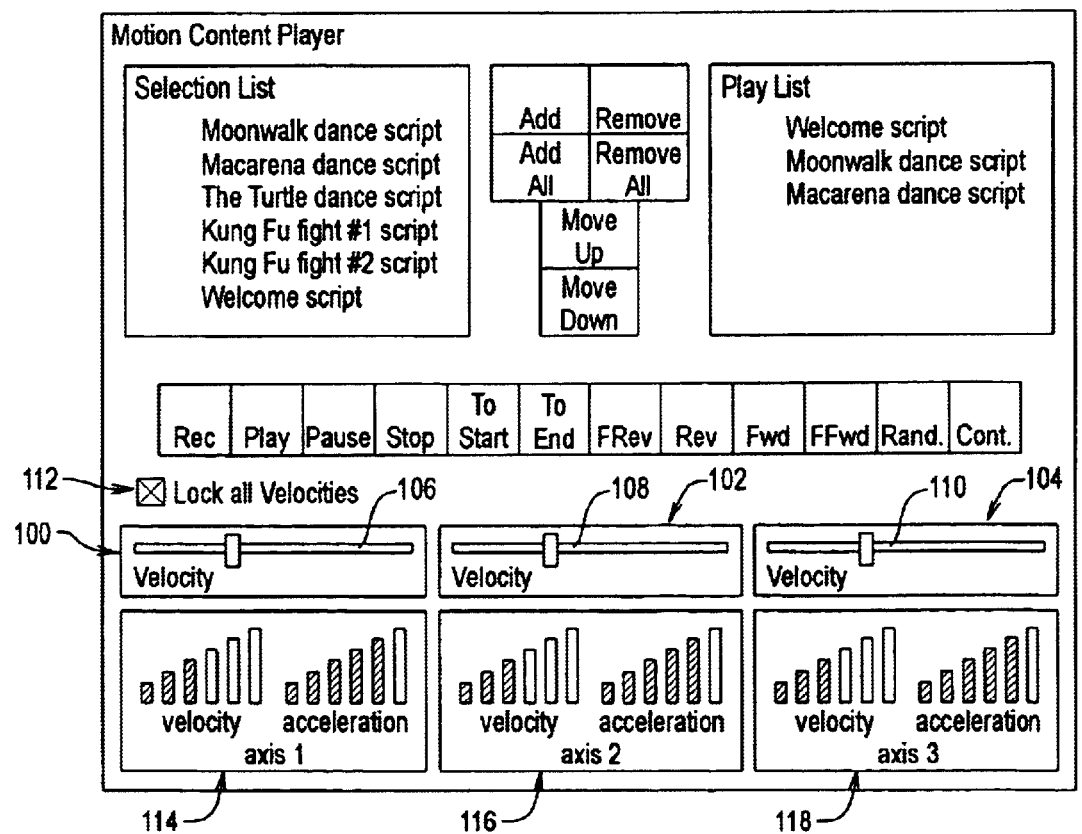
FIG. 6 depicts a fifth embodiment of a user interface that may be used by the control system depicted in FIG. 1.

Referring now to FIG. 6, depicted therein is yet another exemplary interface 50d that is similar to the interface 50b described above but further comprises several new controls 100, 102, and 104 at the bottom thereof. These controls 100, 102, and 104 comprise sliders 106, 108, and 110 that are used to change attributes associated with the content that is run from the Play List 52. Velocity controls are provided to alter the velocity of a specific axis of motion or even all axes at the same time.

Instead of using single controls for each axis, a single master velocity control may also be used to control the velocity on all axes at the same time, thus speeding up or slowing down the current item being played from the play list. Another way of achieving the same ends is with the use of a velocity lock control 112. When selected all velocity controls move in sync with one another regardless of which one the user moves.

Below the velocity controls are the status controls 114, 116, and 118 that display useful information for each axis of motion. For example, status controls may be used to graphically depict the current velocity, acceleration, deceleration, position, or any other motion related property occurring on each axis.

Referring now to FIGS. 7–16, somewhat schematically depicted therein are interface layouts 120, 122, 124, 126, 128, 130, 132, 134, 136, and 138. Each of these layouts 120–138 comprises a selection list 62, a play list 52, play list edit controls 65, and content play controls 75 as described above. The exact content and format of these lists 62 and 52 and controls 65 and 75 may vary from implementation to implementation.

Figure 7:
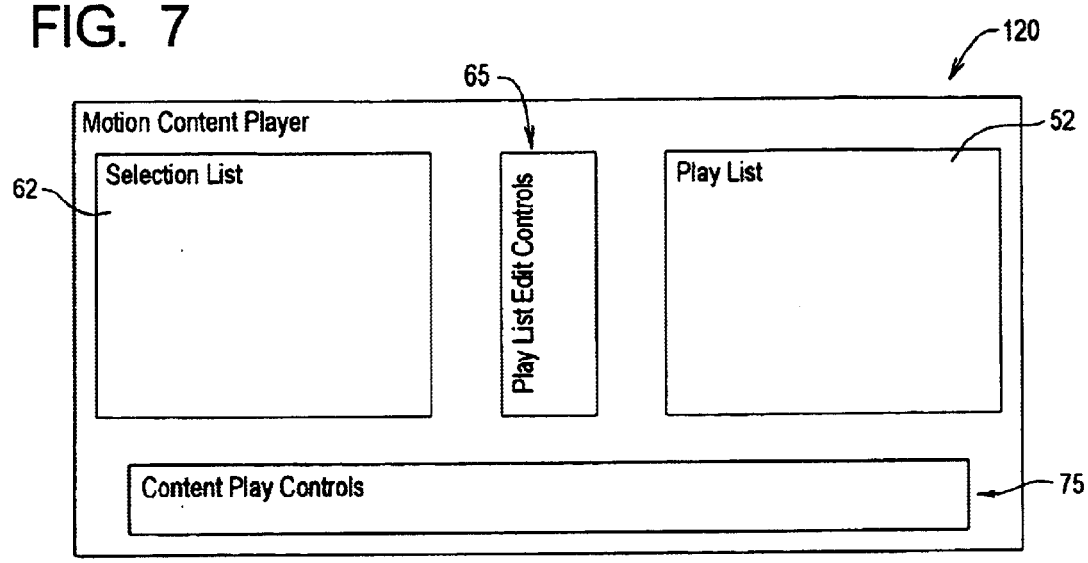
FIG. 7 depicts a first embodiment of an interface layout that may be used by the control system depicted in FIG. 1.

The layout 120 of FIG. 7 corresponds to the layouts of the interface 50a described above.

Figure 8:
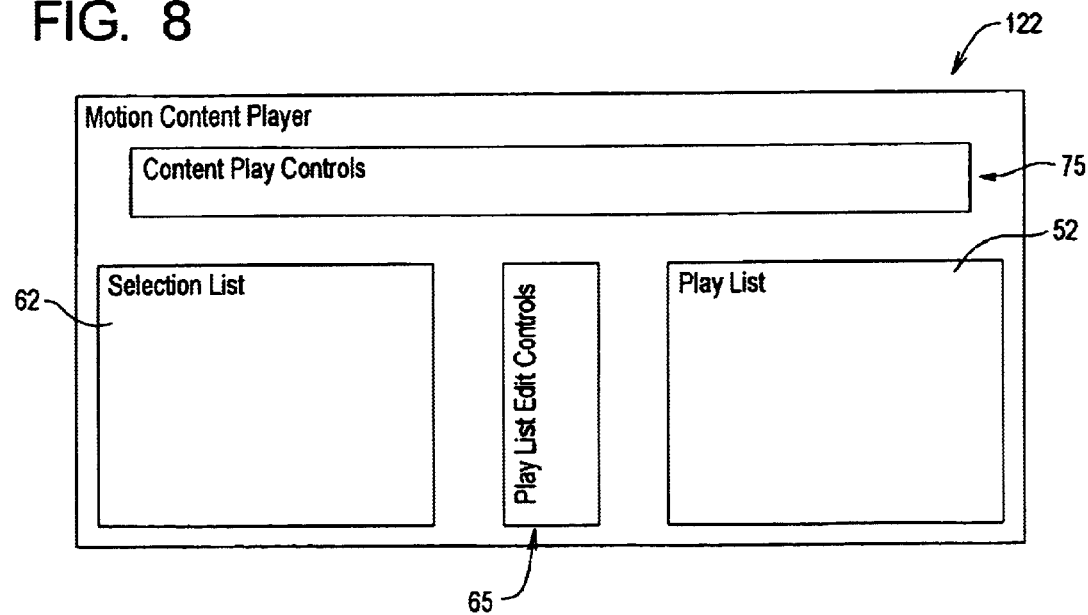
FIG. 8 depicts a second embodiment of an interface layout that may be used by the control system depicted in FIG. 1.

The layout 122 of FIG. 8 arranges the Play List Controls 65 on top.

Figure 9:
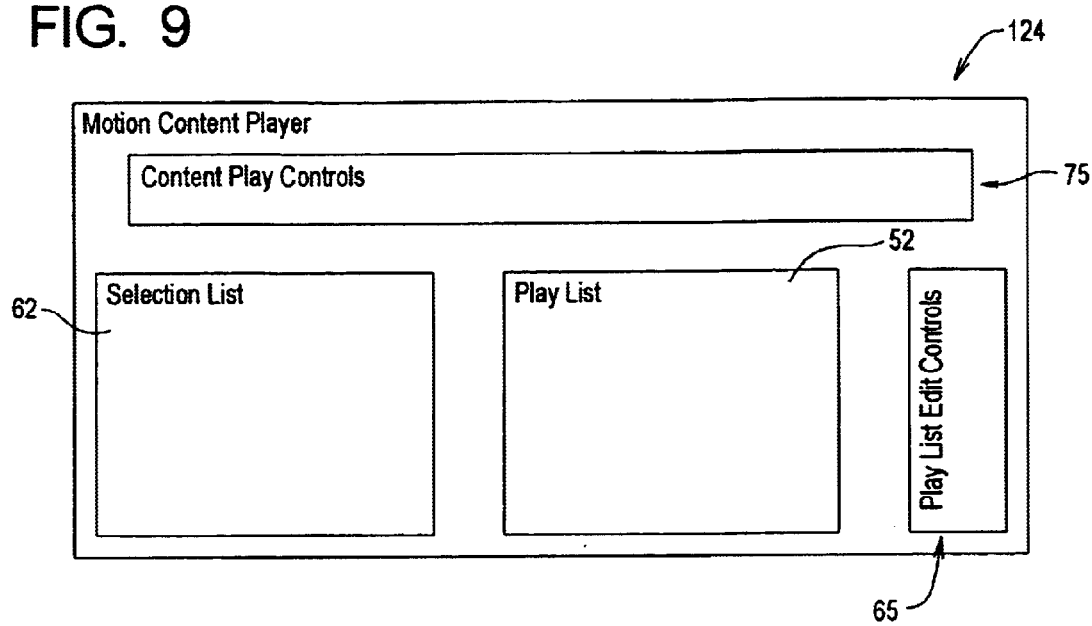
FIG. 9 depicts a third embodiment of an interface layout that may be used by the control system depicted in FIG. 1.

The layout 124 of FIG. 9 arranges the play list controls 65 to the right and the content play controls on top.

Figure 10:
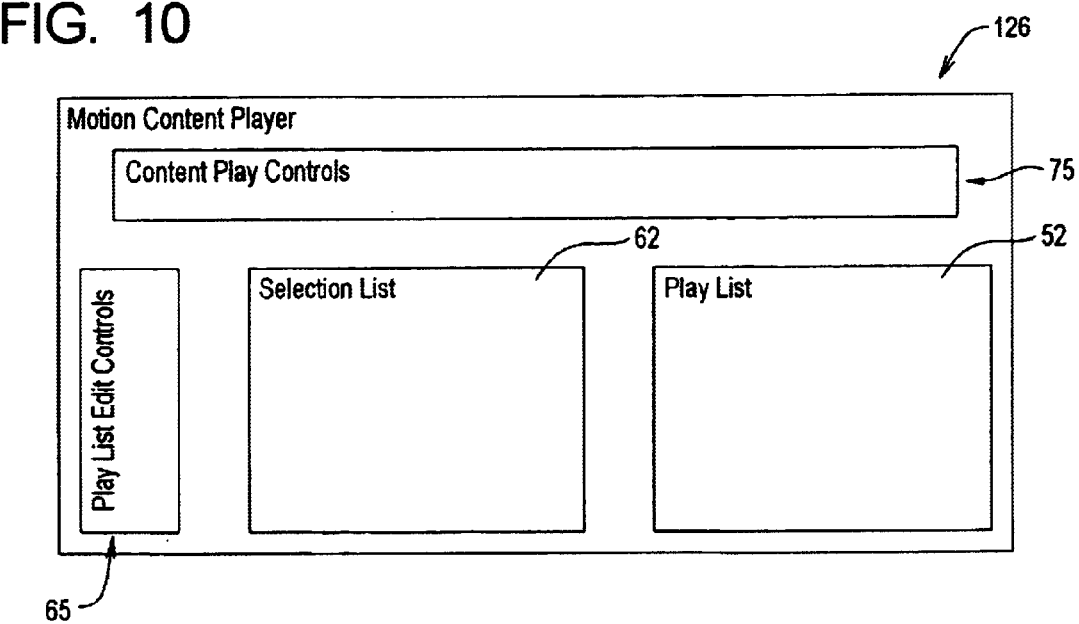
FIG. 10 depicts a fourth embodiment of an interface layout that may be used by the control system depicted in FIG. 1.

The layout 126 of FIG. 10 arranges the Play Controls 75 on Top and the Edit Controls to the left.

Figure 11:
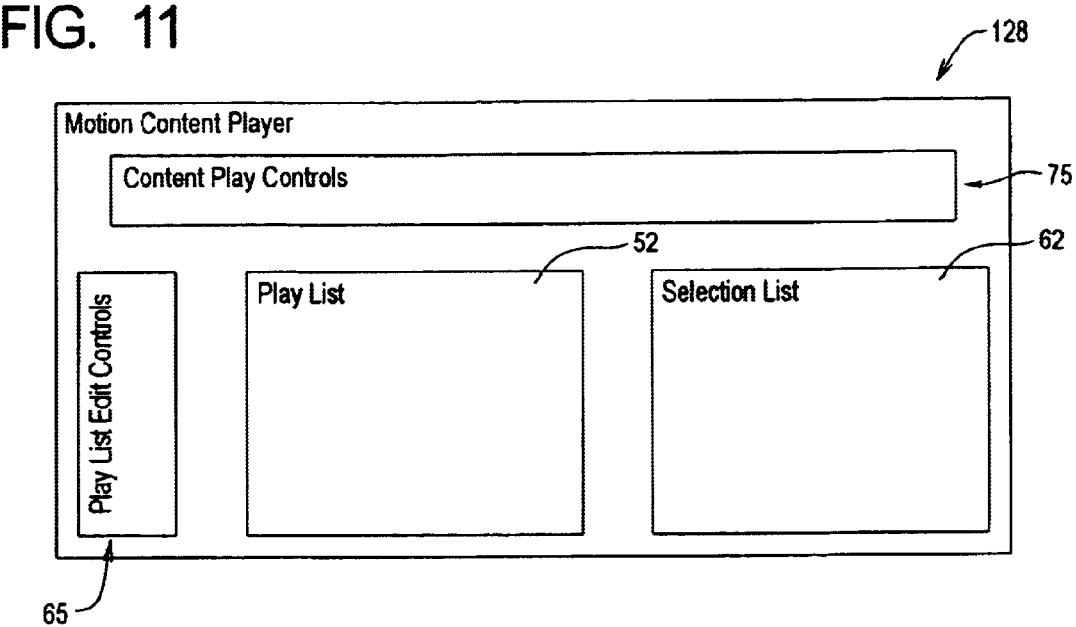
FIG. 11 depicts a fifth embodiment of an interface layout that may be used by the control system depicted in FIG. 1.

The layout 128 of FIG. 11 arranges the Play Controls 75 on Top and the Edit Controls 65 to the Left, with the positions of the Play List 52 and Selection Lists 62 reversed.

Figure 12:
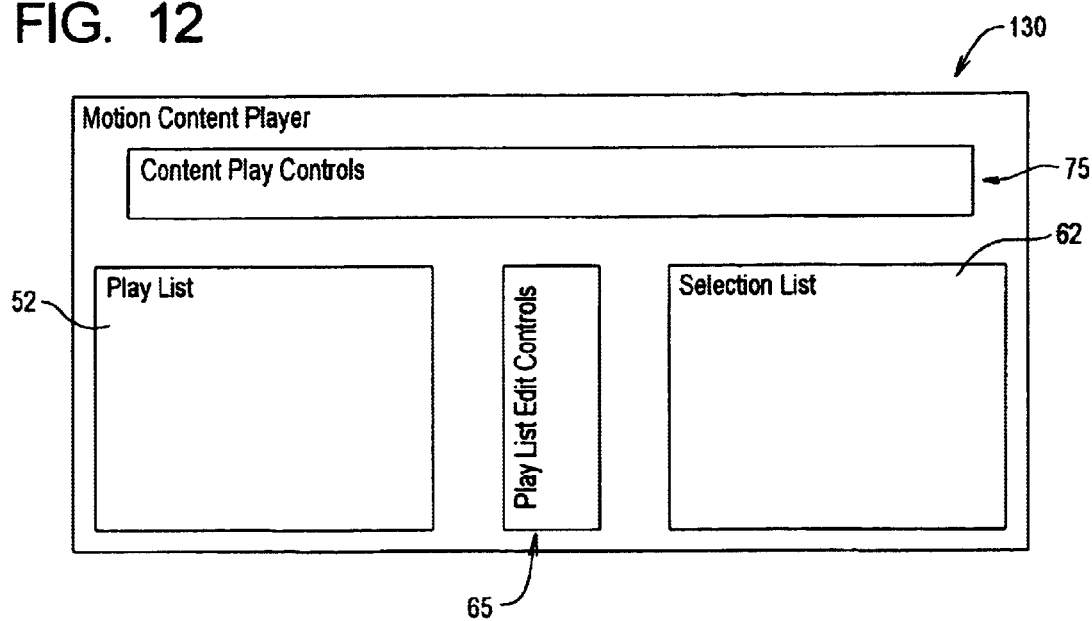
FIG. 12 depicts a sixth embodiment of an interface layout that may be used by the control system depicted in FIG. 1.

The layout 130 of FIG. 12 arranges the play controls 75 on top, the play list 52 at left, and the selection list 62 at right.

Figure 13:
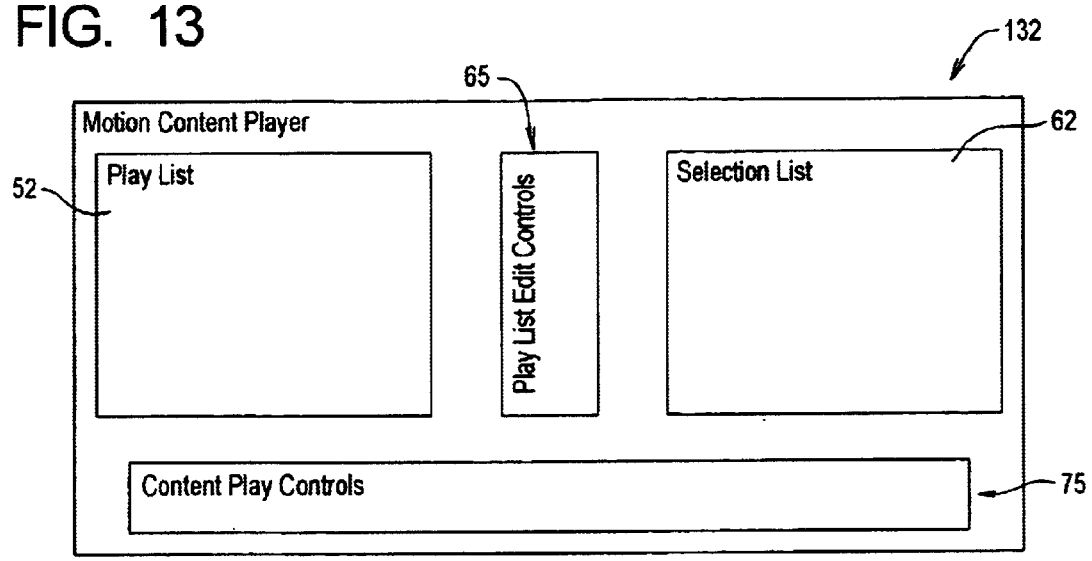
FIG. 13 depicts a seventh embodiment of an interface layout that may be used by the control system depicted in FIG. 1.

The layout 132 of FIG. 13 arranges the Play Controls 75 on the bottom, the Play List 52 on the left, and the Selection List 62 on the right.

Figure 14:
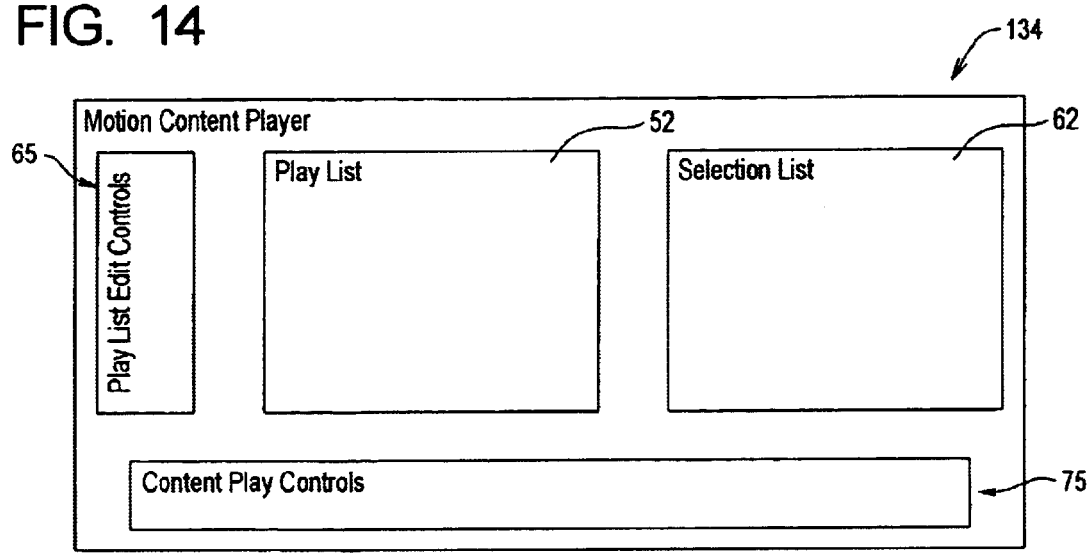
FIG. 14 depicts an eighth embodiment of an interface layout that may be used by the control system depicted in FIG. 1.

The layout 134 of FIG. 14 arranges the Play Controls 75 on the bottom, the Edit Controls 65 on Left, the Play List 52 next, and the Selection List 62 on the right.

Figure 15:
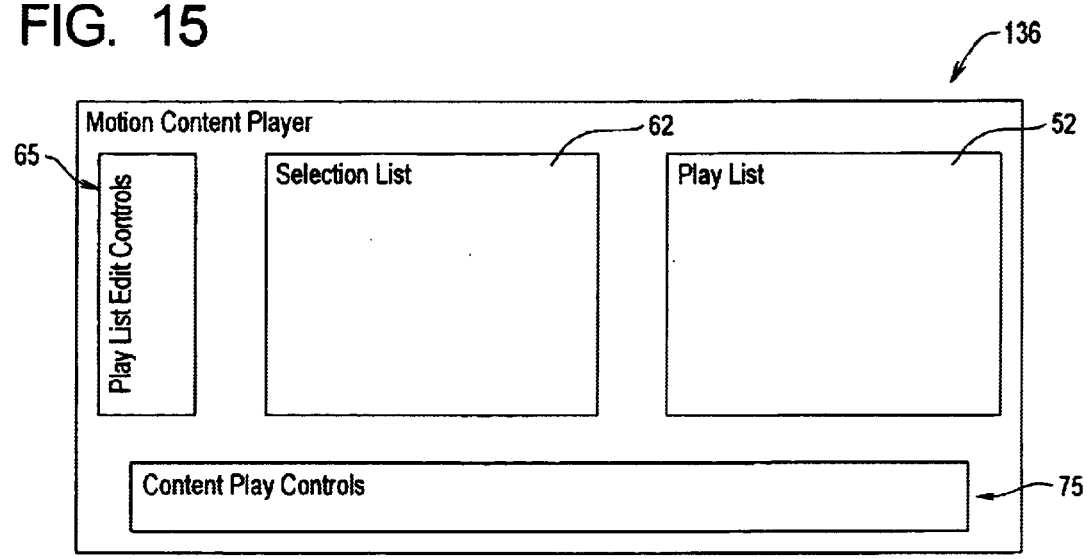
FIG. 15 depicts a ninth embodiment of an interface layout that may be used by the control system depicted in FIG. 1.

The layout 136 of FIG. 15 arranges the Play Controls 75 on the bottom, the Edit Controls 65 on the left, the Selection List 62 next, and the Play List 52 on the right.

Figure 16:
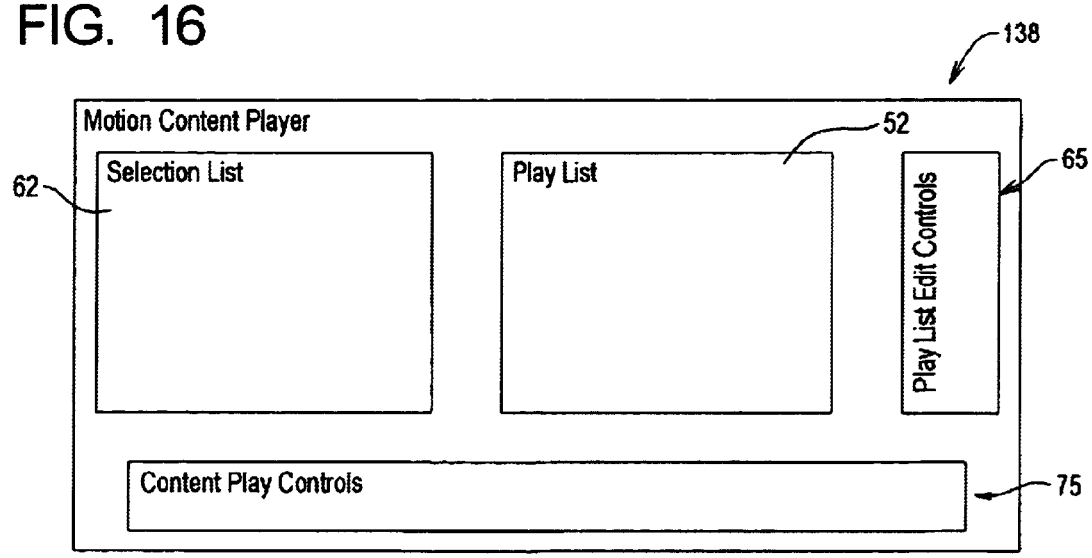
FIG. 16 depicts a tenth embodiment of an interface layout that may be used by the control system depicted in FIG. 1.

The layout 138 of FIG. 16 arranges the Play Controls 75 on the bottom, the Selection List 62 on the left, then the Play List 52, and the Edit Controls 65 on the right.

These examples have been provided to show that as long as the controls provided all support a common functionality their general layout does not change the overall player's functionality other than making the application more or less intuitive (and or easier) to use. Certain of these layouts may be preferred, however, depending on a particular set of circumstances.

What is claimed is:

1. A motion system comprising:
   a motion device, where the motion device operates under control of motion data to perform movement sequences;
   a display;
   a motion system for converting machine independent motion instructions and data into machine specific motion instructions and data; and
   a processing device in communication with the motion device and the display,
   where the processing device stores at least one script item, the at least one script item stored by the processing device is associated with machine independent motion instructions and data, and the processing device generates an interface on the display comprising
- a play list containing at least one script item and
- at least one content play control for transferring the machine independent motion instructions and data associated with the at least one script item of the play list to the motion system; whereby the motion system converts the machine independent motion instructions and data associated with the at least one script item of the play list into machine specific motion instructions and data for the motion device; and the machine specific motion instructions and data associated with the at least one script item of the play list is transferred to the motion device to cause the motion device to perform the movement sequence associated with the at least one script item in the play list.

2. A motion system as recited in claim 1, which:
the play list comprises a plurality of script items; and
the at least one content play control causes the motion device to perform the movement sequences associated with each of the plurality of script items in the play list.

3. A motion system as recited in claim 1, in which the interface further comprises a selection list containing at least one script item, where the play list script items are a subset of the selection list script items.

4. A motion system as recited in claim 1, in which the interface further comprises a selection list containing at least one script item, where the play list script items are selected from the selection list script items.

5. A motion system as recited in claim 4, in which the interface further comprises at least one edit control for allowing a user to select the selected script items from the selection list and place the selected script items on the play list.

6. A motion system as recited in claim 1, further comprising:
a media source in communication with the processing device, where the media source contains at least one script item having machine independent motion instructions and data associated therewith; and
a download system for allowing a user to download the at least one script item and the machine independent motion instructions and data associated therewith from the media source to the processing device.

7. A motion system as recited in claim 1, in which the at least one content play control causes the processing device to transfer to the motion device the machine specific motion instructions and data associated with the at least one script item in the play list.

8. A motion system as recited in claim 1, in which:
the play list contains a plurality of script items; and
the at least one content play control causes the processing device to transfer to the motion device the machine specific motion instructions and data associated with the plurality of script items in the play list to cause the motion device to perform the movement sequences associated with the plurality of script items in the play list.

9. A motion system as recited in claim 8, in which the at least one content play control causes the motion device to perform a plurality of desired movement sequences in a random order.

10. A motion system as recited in claim 8, in which the at least one content play control causes the motion device to perform a plurality of desired movement sequences in a predetermined order.

11. A motion system as recited in claim 1, in which:
the play list comprises a plurality of script items; and
the interface further comprises current play indicator means for indicating which of the script items in the play list is currently being played.

12. A motion system as recited in claim 1, further comprising at least one attribute control that allows a user to change at least one motion related property associated with the machine independent motion instructions and data of the at least one script item in the play list.

13. A motion system as recited in claim 12, in which activating the content play control further causes the machine specific motion instructions and data associated with the at least one script item in the play list to be transferred from the processing device to the motion device.

14. A method of causing physical motion, comprising the steps of:
providing a motion device;
providing a display;
providing a motion system for converting machine independent motion instructions and data into machine specific motion instructions and data;
storing machine independent motion instructions and data for controlling the motion device;
associating the machine independent motion instructions and data with at least one script item, where the machine independent motion instructions and data associated with the at least one script item defines a movement sequence to be performed by the motion device;
generating an interface on the display comprising
a play list containing at least one script item and
at least one content play control; and
activating the content play control to cause the motion system to convert the machine independent motion instructions and data associated with the at least one script item of the play list into machine specific motion instructions and data for the motion device; and
transferring the machine specific motion instructions and data associated with the at least one script item of the play list to the motion device to cause the motion device to perform the movement sequence associated with the at least one script item in the play list.

15. A motion system as recited in claim 14, further comprising the steps of:
generating a selection list on the display containing at least one script item; and
selecting the at least one play list script item from the at least one selection list script item.

16. A method as recited in claim 15, further comprising the steps of:
generating at least one edit control on the display; and
actuating the at least one edit control to move at least one script item from the selection list to the play list.

17. A method as recited in claim 14, further comprising the steps of:
providing a media source in communication with the processing device, where the media source stores at least one script item and machine independent motion instructions and data associated with the at least one script item; and downloading at least one script item and the machine independent motion instructions and data associated therewith from the media source to the processing device.

18. A motion system comprising:

a motion device;

a display;

a motion system for converting machine independent motion instructions and data into machine specific motion instructions and data; and a processing device in communication with the motion device and the display, where the processing device stores a plurality of script items, where each script item is associated with machine independent motion instructions and data that causes the motion device to perform a movement sequence, and runs a software program that generates an interface on the display comprising a selection list containing at least one script item, a play list, at least one edit control for allowing a user to select at least one script item from the selection list and place the selected script item in the play list, and at least one content play control for transferring the machine independent motion instructions and data associated with the at least one script item of the play list to the motion system; whereby the motion system converts the machine independent motion instructions and data associated with the at least one script item of the play list into machine specific motion instructions and data for the motion device; and the machine specific motion instructions and data associated with the at least one script item of the play list is transferred to the motion device to cause the motion device to perform the movement sequence associated with the script item in the play list.

19. A motion system as recited in claim 18, further comprising:

a media source in communication with the processing device, where the media source contains at least script item having machine dependent motion instructions and data associated therewith; and a download system for allowing a user to download from the media source to the processing device machine specific motion data associated with the at least one script item in the playlist.

20. A motion system as recited in claim 18, in which:

the play list comprises a plurality of script items; and the interface further comprises current play indicator means for indicating which of the script items in the play list is currently being played.

21. A motion system as recited in claim 18, in which the interface further comprises at least one attribute control that allows a user to change at least one motion related property associated with the machine independent motion instructions and data of the at least one script item in the play list.

22. A motion system as recited in claim 18, in which the at least one content play control causes the machine independent motion instructions and data associated with the script item in the play list to be transferred from the processing device to the motion device.

* * * * *

UNITED STATES PATENT AND TRADEMARK OFFICE
CERTIFICATE OF CORRECTION

PATENT NO. : 6,879,862 B2
DATED : April 12, 2005
INVENTOR(S) : David W. Brown and Jay S. Clark It is certified that error appears in the above-identified patent and that said Letters Patent is hereby corrected as shown below:

<u>Column 10,</u>
Line 49, "motion system" should be -- method --

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,879,862 B2
APPLICATION NO. : 09/796566
DATED : April 12, 2005
INVENTOR(S) : David W. Brown and Jay S. Clark It is certified that error appears in the above-identified patent and that said Letters Patent is hereby corrected as shown below:

On the title page, item [56] add References Cited as shown below.

U.S. Patent Documents

| | | |
|---|---|---|
| 6,662,361 | Jackson, Andrea Ontko | 2-2003 |
| 4,815,011 | Mizuno et al. | 03-1989 |
| 4,688,195 | Thompson et al. | 08-1987 |
| 4,782,444 | Munshi et al. | 11-1988 |
| 4,912,650 | Tanaka et al. | 03-1990 |
| 5,020,021 | Kaji et al. | 05-1991 |
| 5,175,684 | Chong, Leighton K. | 12-1992 |
| 5,175,856 | Van Dyke et al. | 12-1992 |
| 5,541,838 | Koyama et al. | 05-2000 |
| 6,070,010 | Keenleyside et al. | 05-2000 |
| 6,090,156 | MacLeod, Andrew W. | 07-2000 |
| 6,233,545 | Datig, William E. | 05-2001 |
| 6,317,871 | Andrews et al. | 11-2001 |
| 6,425,118 | Molloy et al. | 07-2002 |
| 6,463,404 | Appleby, Stephen C | 10-2002 |
| 6,523,171 | Dupuy et al. | 02-2003 |
| 6,658,627 | Gallup et al. | 12-2003 |
| 6,665,688 | Callahan et al. | 12-2003 |
| 6,778,949 | Duan et al. | 08-2004 |
| 4,199,814 | Rapp et al. | 04-1980 |
| 5,005,135 | Morser et al. | 04-1991 |
| 5,511,147 | Abdel-Malek, Karim | 04-1996 |
| 6,528,963 | Hong, Yong-joon | 03-2003 |

On the title page, item [56] add References Cited as shown below.

U.S. Patent Documents

U.S. Pub. No. 2001/0029443 A1 to Miyahira
U.S. Pub. No. 2001/0037492 A1 to Holzmann
U.S. Pub. No. 2002/0165708 A1 to Kumhyr
U.S. Pub. No. 2003/0033150 A1 to Balan et al.
U.S. Pub. No. 2003/0061023 A1 to Menezes et al.
U.S. Pub. No. 2004/0025150 A1 to Heishi et al.

UNITED STATES PATENT AND TRADEMARK OFFICE
CERTIFICATE OF CORRECTION

PATENT NO. : 6,879,862 B2
APPLICATION NO. : 09/796566
DATED : April 12, 2005
INVENTOR(S) : David W. Brown and Jay S. Clark It is certified that error appears in the above-identified patent and that said Letters Patent is hereby corrected as shown below:

Foreign Patent Documents item [56] add.

| | | |
|---|---|---|
| JP 08161335 | Fukumochi, Youji | 06-1996 |
| JP2000020114A | OBA et al. | 01-2000 |
| EP 821522 A2 | SATO et al. | 01-1998 |

On the title page, item [56] add References Cited as shown below.

Other Publications

MICROSOFT CORPORATION; "Dynamic Data Exchange"; Windows 3.1 SDK Guide to Programming; 1992, 1993; Chapter 22; 21 pages.

MICROSOFT CORPORATION; "Dynamic Data Exchange Management Library"; Win32 SDK: Prog. Ref. Vol. 2; 1992, 1993; Chapter 77; 26 pages.

MICROSOFT CORPORATION; "Network Dynamic Data Exchange"; Windows for Workgroups 3.1 Resource Kit; 1192, 1993; Chapter 11; 19 pages.

Signed and Sealed this

Twenty-sixth Day of May, 2009

JOHN DOLL
*Acting Director of the United States Patent and Trademark Office*